METHOD OF MAKING A PRINTED CIRCUIT

Filed Feb. 6, 1957

INVENTORS
Norman L. Greenman
John A. Zagusta
Paul L. Anderson
BY
Robert R. Churchill
ATTORNEY

United States Patent Office 2,986,804

Patented June 6, 1961

2,986,804

METHOD OF MAKING A PRINTED CIRCUIT

Norman L. Greenman, Danielson, Conn., John A. Zagusta, Jackson Heights, N.Y., and Paul L. Anderson, Rockville, Conn., assignors to Rogers Corporation, Manchester, Conn., a corporation of Massachusetts Filed Feb. 6, 1957, Ser. No. 638,491
5 Claims. (Cl. 29—155.5)

This invention relates to printed circuits and to methods of making the same.

The invention has for an object a novel and improved method of producing a printed circuit embodying a molded insulating fibrous base member and an electrically conductive pattern on one or more surfaces of the molded insulating fibrous base member whereby the printed circuit may be produced in a rapid and economical manner.

With this general object in view and such others as may hereinafter appear, the invention consists in the method of making printed circuits hereinafter described and particularly defined in the claims at the end of this specification.

In the drawings illustrating the preferred method of making the printed circuit:

Figure 1:
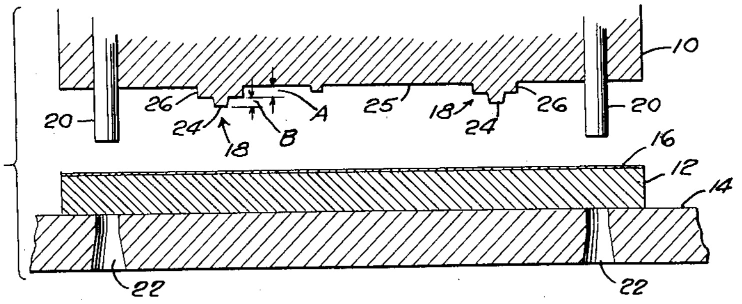
FIG. 1 is a cross-sectional view of a stamping die employed in carrying out the present method.
Figure 2:
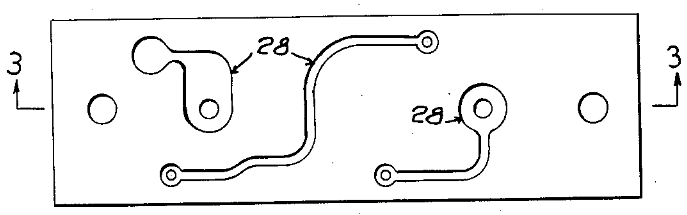
FIG. 2 is a plan view of a printed circuit embedded in the fibrous base member as produced by the die stamping operation.

In its preferred form the invention is concerned primarily with the production of so-called "printed circuits" of the type wherein an assembly of a moldable insulating fibrous base sheet having the requisite physical and electrical properties is provided upon a surface thereof with an electrically conductive detailed metallic pattern and the assembly subjected to molding during which it may be formed and cured by the proper temperature, time and pressure cycle following the disclosure in our copending application, Serial No. 566,962, filed February 21, 1956.

As set forth in our said application the assemblies may be provided with holes for the reception of accessory elements, such as terminals, connectors and the like, by ordinray punching operations or in any other suitable manner, as by formation during the molding operation. After the assembly has been produced, as thus far described, it may be molded and the accessory elements anchored in the base by the flow of moldable material during the molding operation in and around the terminals, connectors, or other accessory elements, thus producing a molded assembly in a most economical and practical manner.

One of the principal advantages flows from the fact that the assembly, as thus far described, lends itself to molding operations in which it may be formed and cured by the proper temperature, time and pressure cycle to a three-dimensional shape, as distinguished from the phenolic laminates which have been generally heretofore used for the production of printed circuits and which have been available in flat, fully cured sheets, thereby restricting the pattern and the board to planar or two-dimensional surfaces. For example, the present assembly may be molded and shaped to form right angle pieces to provide the structure with ribs for reinforcing purposes, to enable slots to be molded therein which otherwise would have to be machined to provide mounting corners for the assembly and to enable the whole chassis of the printed circuit to be molded. Tapered holes for the accessories and molded edges may be formed during the molding operation. In general this characteristic opens up a wide range of design possibilities as compared to the limitations of the flat, punched, phenolic laminates of the prior art.

As also set forth in said application, the moldable fibrous resin base preferably embodies a curable resin. The metal conductive pattern may be formed and applied by a stamping operation and adhesively affixed to the surface of the uncured moldable fibrous base sheet. Thereafter the openings or holes for the reception of the terminal pins, socket pins, eyelets or other hardware can be molded into the base without prepunching the uncured sheet, and eliminating subsequent drilling, mounting and staking operations. After the basic pattern has been applied, then the assembly is subjected to molding at temperatures and pressures according to the particular resin employed, resulting in the formation of a resin skin covering all edges of the base assembly, and in addition covering the walls of any holes which have been formed in the base, either prior to or during the molding operation. This skin of resin distinguishes the present molded base from the prior art structures and represents a very substantial advance in the art in that the moisture absorption characteristics and the accompanying effect on the electrical insulating properties of the base are greatly reduced. The molding operation may result in the production of a finished molded electrically conductive pattern whose upper surface is flush with the surface of the base, allowing portions or all of the pattern to be used as a switch or commutator stator, or in accordance with the present invention the electrically conductive pattern may be embedded a substantial distance below the surface.

The moldable fibrous base preferably embodies thermosetting resins as the impregnant for the fibrous board or sheet, and such resins may be of the heat curable type, of the pressure curable type, and preferably of the heat and pressure curable type. Such resins may include the phenolic formaldehyde resins, the melamine resins, epoxy resins, polyester resins, the urea formaldehyde resins, silicones and others. Preferably, portions of such resins may vary from 25% to 70% by weight based on the weight of the finished product. The fibrous base itself may be formed in whole or in part from fibers including cellulose, glass, asbestos or similar fibers, such as polyamide, polyester, aluminum oxide fibers and various mineral fibers and combinations thereof.

In practice copper is preferably utilized in producing the metallic electrically conductive pattern, preferably in the form of a foil or produced by electroplating or other methods, although other suitable metals may if desired be used for this purpose. As will be hereinafter described in connection with the novel method of producing a printed circuit panel in accordance with the present invention, it is desirable that the metal foil be provided with a heat curable adhesive of the type which may be subsequently cured by the application of both heat and pressure or heat alone during the molding operation. Alternatively, the adhesive may be applied as a coating to the fibrous board, or the adhesive may comprise a relatively thin film interposed between the metal foil and the board. In either case the strength of adhesive bond may be enhanced by a treatment to provide a film of copper oxide on the surface of copper pattern to be bonded. Such surface treatment of the copper may be readily accomplished by immersion in an alkaline bath as marketed by Enthone Corporation under trade name "Ebonol C." Typical of these adhesives include any of the commercially available pressure or heat sensitive adhesive including: Phenolic Butyral Adhesives—manufactured by Bakelite Co. and sold under the name "B. J. 16320." Modified Epoxy Adhesives—manufactured by Rubber & Asbestos Corp. and sold as "Ply-Master."

The surface coating which may be utilized on the surface of the fibrous base sheet, as set forth in our said application, may include epoxy resins, phenolic formaldehyde resins, the various commercial polyester resins, the melamine resins, the silicones and others. The surface coating is preferably of a nature such as to be substantially non-flowing during molding, thus insuring that no resin skin forms over the electrically conductive pattern. The formation of such skin would interfere with the soldering operations.

In accordance with the present method of producing the printed circuit panel, the formation of the electrically conductive metallic pattern on the moldable fibrous insulating base contemplates a die stamping operation wherein a metal foil sheet placed on top of the uncured base material is impressed into depressed portions of the base material below the surface thereof, the uncured base material cooperating with the stamping die to shear the metal sheet, the base serving as the second member of the die. It has been found in practice that while the uncured insulating fibrous base material embodying a curable resin lends itself to compression so that impressions may be formed therein, such as shouldered depressions and other third dimensional shapes, yet the uncured base material retains sufficient rigidity to effect shearing of the foil sheet in cooperation with the die or punch member so as to embed the desired electrically conductive pattern into the depressed portions below the surface of the base material. The present method also lends itself particularly to the embedding of a relatively thin foil pattern into the depressed portions of the uncured moldable base material and provides greater flexibility in pattern design. The thickness of the metal foil may vary from less than .001" to .005", although good results may be obtained with a thickness up to .008".

Referring now to the drawings, the preferred form of apparatus for stamping out and embedding the metallic pattern into depressed portions below the surface of the moldable base material to form a printed circuit panel includes a pattern stamping and embedding punch or die indicated generally at 10 which may be mounted on the movable member of a conventional punch press. The uncured insulating base material 12 is placed on top of a supporting base member 14 which may be secured to the stationary portion of the punch press. A strip of metal foil 16 having its underside provided with a coating of adhesive is placed on top of the base material 12. The embossed portions 18 of the punch member 10 for delineating the pattern may be relatively shallow and may be engraved or otherwise formed thereon. The punch member 10 is also provided with indexing punches 20 for piercing the insulating base material for registration purposes.

In the operation of the apparatus when the punch member 10 is lowered, the indexing punches 20 first engage and pierce the metallic foil 16 and the insulating base material 12 in cooperation with the supporting base 14, suitable tapered openings 22 being provided to permit the scrap material to fall through the supporting base 14, as shown. The engraved portions 18 of the punch then engage the material, and in cooperation with the material itself which serves as the female die the metal foil pattern is cut and embedded into the base material, and upon further movement of the punch the base material is compressed to dispose the metal foil pattern in the depressions thus formed below the surface of the moldable base material, the metal foil pattern adhering to the insulating base by virtue of the adhesive coating on the underside of the metal foil.

It will be observed that the present method of stamping the metal foil pattern and embedding and adhesively securing the same to the uncured moldable base material eliminates the use of a female die member, and further the present method enables the base material to be compressed to form indentations or depressions in the material at different levels relative to the upper surface of the material and into which depressions the electrical conducting pattern may be secured at such different levels. As herein indicated, the embossed or engraved portions 18 of the punch member 10 delineating the pattern to be cut may include a relatively small diameter extended portion 24 concentric with the terminal portions 26 of the patterns and which comprise hole indenting members forming partial openings in the base material, which openings are subsequently completed through the base material during the molding operation. In practice the extended portions 24 may and preferably will be slightly tapered as shown.

In practice the insulating base material 12 may vary in thickness, and the height of the engraved punch portions 18 are relatively small. For example, in the illustrated embodiment of the invention the insulating base member 12 may be about $\frac{3}{32}$ to $\frac{1}{8}$ inch in thickness in its uncured form, and the height of the pattern cutting portions, indicated at A, may vary between .016" and .025" in height. The height of the hole identing portions 24 beyond the pattern cutting portions, as indicated at B, may also vary between .016" and .025" in height. While the electrically conductive patterns herein illustrated are shown as embedded below the surface of the base material at a single level, it will be apparent that the different patterns may be disposed at different levels below the surface if desired.

As above described, the metal foil is provided with a heat curable adhesive which may be subsequently cured by the application of both heat and pressure, and in practice it is preferred to heat the punch member 10 to render the adhesive tacky and to effect partial setting of the adhesively coated pattern to the base member to insure adhesion thereto during the stamping operation. The temperature of the punch may vary between 120° and 350° depending on the speed of the stamping operation, the higher temperatures being employed with higher speeds of stamping, and the pressure applied to perform the stamping operation may vary in accordance with the temperature and the area of the material being impressed. It will be understood that during the stamping operation the projecting portions of the punch delineating the pattern are fully extended into the material until the base surface 25 of the punch engages the upper surface of the base material. In this manner the metal foil is secured between the base of the punch and the top surface of the board such that the metal foil is sheared instead of being dragged into the depression formed by the punch. After the stamping operation the unwanted copper remaining on the upper surface of the base material may be removed and salvaged in a known manner.

From the foregoing description it will be apparent that the successful operation of the present process depends upon several factors, such as the height of the punch, temperature of the punch and board, and speed of the punching operation.

Figure 4:
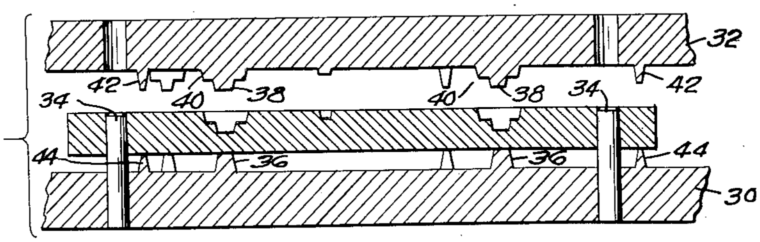
FIG. 4 is a cross-sectional view of the die stamped printed circuit placed within a flash mold.
Figure 5:
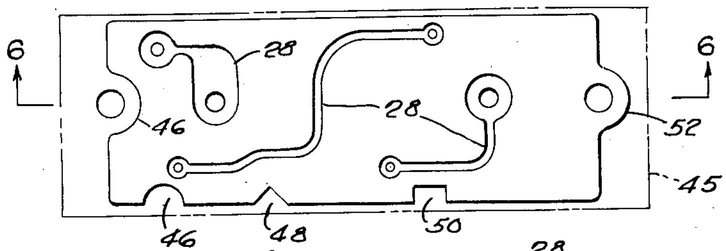
FIG. 5 is a plan view of the printed circuit panel after the molding operation.
Figure 6:
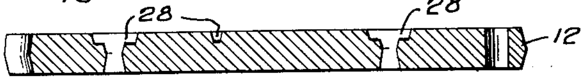
FIG. 6 is a cross-sectional view taken on the line 6—6 of FIG. 5.

The base member 12 with its electrically conductive pattern indicated at 28 may then be placed in a flash mold, as shown in Fig. 4. The illustrated mold includes a bottom half 30 and a top half 32, the bottom half being provided with registration pins 34 which are fitted into the pierced openings in the base member. It will be observed that the top half 32 of the mold is shaped to correspond substantially with the shape of the punch member 10 delineating the pattern embedded into the base material except that the vertical edges thereof may be slightly tapering in accordance with the usual molding practices, and the bottom half 30 of the mold is provided with upstanding tapering projections 36 aligned with the projections 38 corresponding to the hole indenting projections 24 of the punch. In practice the total height of the projections 40 of the upper mold 32 and the projections 36 of the lower mold 30 are substantially equal to or slightly less than the thickness of the panel to allow for compression of the panel so that when the mold parts are closed the projections will meet to form through openings in the panel. As herein shown, this expedient is also used to blank out the outer shape of the finished panel during the molding operation. Thus, continuous linear projections 42, 44 in the upper and lower mold halves respectively delineating the outer periphery of the panel cooperate during the molding operation to cut and mold the final shape of the panel, as shown in FIG. 5, wherein the dotted lines 45 indicate the scrap material. Each linear projection 42, 44 may be slightly tapered, as shown, in accordance with the usual molding practices and may be of a height such that they will meet when the mold halves are closed. As indicated at 46, 48, 50, the outline delineated by the linear projections 42, 44 may take various shapes to provide cutouts in the panel as required for special purposes, or the outline may take the form of lateral projections as indicated at 52. The molding operation is conducted in accordance with known procedure utilizing the proper temperature, time and pressure cycle depending upon the character of the fibrous base and the amount and character of resin embodied in the fibrous base. Thus, the assembly is subjected to heat and pressure sufficient to effect curing of the moldable fibrous material and to result in the formation of a resin skin covering the exterior surfaces of the base assembly and the walls of the holes therein. The electrically conductive pattern disposed below the surface of the base is engaged by the projections in the upper half of the mold, and during the molding operation the adhesive on the metal foil is sufficiently cured so as to effect secure bonding of the electrically conductive pattern to the base material. Preferably, the product may be subjected to a subsequent baking operation to insure completion of the bonding and curing.

It will be understood that the assemblies of the moldable insulating fibrous base and the metallic pattern may have holes formed therein, as by punching operations, or during the molding operation. Either before or after the molding operation the accessories, such as terminals, connectors, and the like, may be assembled in the holes and affixed to the base and in operative relation to the metallic circuit pattern. During the molding operation the desired contour may be imparted to the finished panel in planar or three dimensional shape and the edges of the panel and the walls of any holes formed therein coated with a resin skin following the general procedure of our said application. One advantage in forming the openings during the molding operation is that relatively smaller openings may be formed in this manner than by subsequent punching operations in the cured panel.

Figure 3:
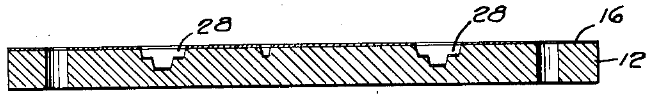
FIG. 3 is a cross-sectional view of the same as taken on the line 3—3 of FIG. 2.

In a modified form of the present invention the base material may comprise a compressible base material having suitable insulating properties which may be either a moldable or a non-moldable base material, and such base material may be provided with an electrically conductive pattern impressed thereon in the manner disclosed in FIG. 1 to embed the conductive pattern into depressed portions below the surface of the base material to provide a panel as disclosed in FIG. 3. A panel thus produced may be economically employed in the manufacture of toys and other inexpensive articles embodying a printed electrical circuit, or may be employed in any applications of printed circuits in which a base material having lower insulating qualities is used.

While the preferred embodiment of the invention has been herein illustrated and described, it will be understood that the invention may be embodied in other forms within the scope of the following claims.

Having thus described the invention, what is claimed is:

1. In the method of making a printed circuit panel wherein a metallic pattern is formed and secured to at least one surface of a fibrous base sheet embodying a curable resin, the steps comprising applying a metal foil sheet to the surface of an uncured base sheet, placing the assembly in a punch press having an upper die provided with the desired pattern embossed on the surface thereof, then stamping the material with the embossed die to effect shearing of the metallic pattern and compression of the base material in the patterned area to embed the stamped foil pattern in the depressions thus formed a substantial distance below the upper surface of the base material, the side walls of the depressions being free of foil and removing the unwanted foil on the surface of the base sheet and then curing the curable resin in the fibrous sheet.

2. In the method of making a printed circuit panel wherein a metallic pattern is formed and secured to at least one surface of a fibrous sheet embodying a curable resin and wherein the assembly of pattern and base sheet is subjected to a molding operation to impart a desired shape to the panel and to cure the resin, the steps comprising applying a metal foil sheet having a curable adhesive coating on the undersurface thereof to the surface of an uncured base sheet, placing the assembly in a punch press having an upper die provided with the desired pattern embossed on the surface thereof, then stamping the assembly with the embossed die and applying pressure to effect shearing of the metallic pattern with the fibrous base sheet acting as the second element of the die, the stamping operation also effecting compression of the base material in the patterned area to embed the stamped foil pattern in the depressions thus formed a substantial distance below the upper surface of the base material, the side walls of the depressions being free of the foil pattern, and removing the unwanted foil from the surface of the base sheet, then subjecting the assembly of the pattern and the base sheet to a molding operation to cure the curable resin in the fibrous sheet and on the underside of the metallic foil pattern.

3. The method of making a printed circuit panel as defined in claim 2 wherein the stamping die is shaped to provide indentation holes forming partial openings in said uncured base sheet, and wherein the mold is shaped to complete said partial openings through the base sheet during the molding operation.

4. The method of making a printed circuit panel as defined in claim 2 wherein the molding operation is performed in a two-part mold having cooperating linear projections defining the outline of the completed panel whereby to effect shaping of the panel to the desired contour during the molding operation.

5. The method of making a printed circuit panel wherein a metallic pattern is formed and secured to at least one surface of a compressible base sheet, the steps comprising applying a metal foil sheet having an adhesive coating on the undersurface thereof to the upper surface of the compressible base sheet, placing the assembly in a punch press having an upper die provided with the desired pattern embossed on the surface thereof, and then stamping the material with the embossed die to effect shearing of the metallic pattern with the base sheet acting as the second element of the die, the stamping operation also effecting compression of the base material and forming stepped depressions in the patterned area and embedding and adhesively securing the foil pattern to only the laterally extended surfaces of the stepped depressions thus formed.

References Cited in the file of this patent

UNITED STATES PATENTS

| | | |
|---|---|---|
| 2,320,498 | Wheeler | June 1, 1943 |
| 2,535,674 | Franklin (B) | Dec. 26, 1950 |
| 2,543,384 | Squier | Feb. 27, 1951 |
| 2,734,150 | Beck | Feb. 7, 1956 |
| 2,753,619 | Franklin (A) | July 10, 1956 |
| 2,757,443 | Steigerwalt et al. | Aug. 7, 1956 |
| 2,772,501 | Malcolm | Dec. 4, 1956 |
| 2,876,393 | Tally et al. | Mar. 3, 1959 |
| 2,912,747 | Oshry et al. | Nov. 17, 1959 |
| 2,912,748 | Gray | Nov. 17, 1959 |

FOREIGN PATENTS

| | | |
|---|---|---|
| 687,094 | France | Aug. 4, 1930 |